Nov. 4, 1958     H. HOFFMANN     2,858,812
INTERNAL COMBUSTION ENGINE OF THE FUEL INJECTION TYPE
Filed March 2, 1956
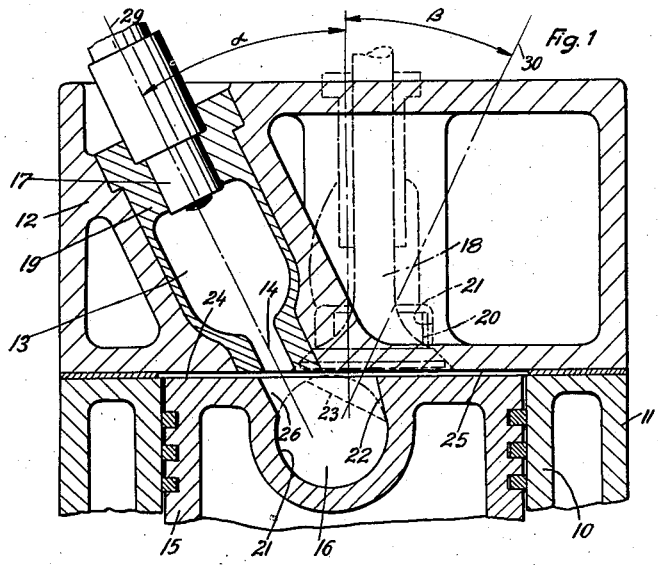
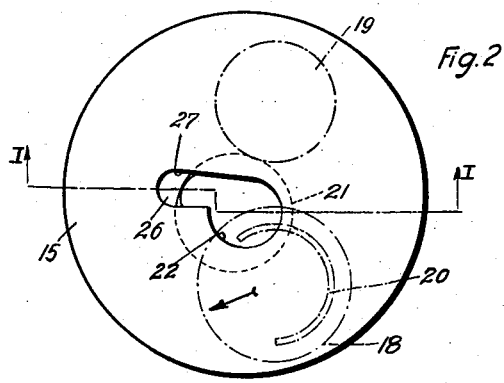
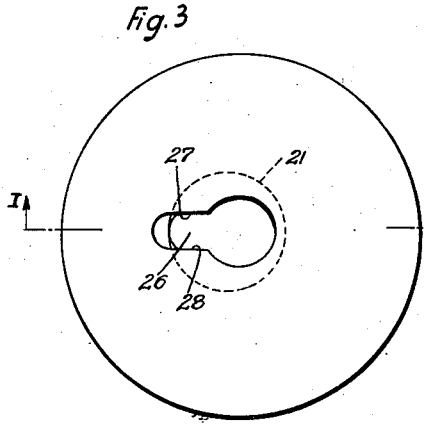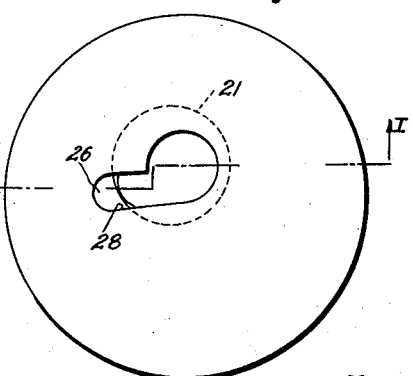
Inventor
HEINRICH HOFFMANN
BY Dicke and Craig
ATTORNEYS.

United States Patent Office 2,858,812
Patented Nov. 4, 1958

2,858,812

INTERNAL COMBUSTION ENGINE OF THE FUEL INJECTION TYPE

Heinrich Hoffmann, Stuttgart-Unterturkheim, Germany, assignor to Daimler-Benz Aktiengesellschaft, Stuttgart-Unterturkheim, Germany Application March 2, 1956, Serial No. 569,172

Claims priority, application Germany March 4, 1955

6 Claims. (Cl. 123—32)

My invention relates to an internal combustion engine of the fuel injection type in which the cylinder head is provided with a precombustion chamber and a passageway leading therefrom into the cylinder, the piston being provided with a combustion cavity and the fuel injecting device mounted in the cylinder head being adapted to issue a jet of fuel into the precombustion chamber.

It is the object of the present invention to so correlate and shape the precombustion chamber, the passageway, the piston cavity and the air inlet means as to ensure complete consumption of the oxygen contained in the air that is present in the piston cavity during the combustion.

More particularly, it is an object of the invention to secure a uniform distribution of any combustible matter issuing from the combustion chamber and entering the piston cavity over the entire air charge contained therein.

Further objects are to so shape the piston as to freely admit a jet issuing from the passageway of the precombustion chamber into the combustion cavity of the piston.

Further objects of the present invention will appear from the detailed description of some preferred embodiments of the invention following hereinafter with reference to the drawings it being understood that the terms and phrases used in such detailed description have been chosen for the purpose of illustrating the invention rather than that of restricting or limiting the same.

The features of novelty for which patent protection is sought are pointed out in the appended claims.

In the drawings:

Fig. 1 is an axial section through the cylinder head and the top portions of the cylinder and the piston, Fig. 2 is a plan view of the piston shown in Fig. 1, the position of the valves being indicated by dash-dotted lines, Fig. 3 is a view similar to that of Fig. 2 of a modified piston incorporating the present invention and Fig. 4 is still another sample of a piston constructed in accordance with the present invention for the co-operation with the cylinder head shown in Fig. 1.

The internal combustion engine comprises a cylinder 10 having a cooling jacket 11, a water-cooled cylinder head 12 provided with a precombustion chamber 13 and with a passageway 14 leading therefrom into the cylinder, and a piston 15 which is reciprocable in the cylinder 10 to and from the position shown in proximity to the cylinder head 12 and formed with a combustion cavity 16. In the position shown the piston 15 and the cylinder head 12 confine the compression space which includes the precombustion chamber 13 and the combustion cavity 16. Furthermore, the engine comprises a fuel injecting device 17 which is mounted in the cylinder head, preferably coaxially to the passageway 14. This device is of a type adapted to issue a jet of fuel into, and preferably through the chamber 13 and the passageway 14 directly into the cavity 16. Moreover, the engine comprises an air inlet valve 18 and an outlet valve 19, Fig. 2, both valves being mounted in the cylinder head and controlling conduits formed therein in the conventional manner.

The precombustion chamber 13 and its passageway 14 are formed by a casting 19 inserted in a suitable bore disposed eccentrically in the cylinder head 12. The inlet valve 18 is formed with a lateral screening web 20 which so cooperates with the internal surface 21 of the inlet air conduit as to restrict the flow of air over the greater part of the periphery of the valve as will appear from Fig. 2, thus causing the air to enter the cylinder substantially in the direction of the arrow in Fig. 2, i. e., in a tangential direction with respect to the cylinder space. Hence, the web 20 constitutes a means which is effective during the suction stroke of the piston to impart a rotary motion to the air charge about the axis of the cylinder. When the rotary air charge is subsequently compressed it will set up an eddy of high angular velocity in the cavity 16, such eddy having an axis parallel to that of the cylinder.

The cavity 16 constitutes the main combustion space. It has a bulbous shape being preferably composed of a sphere 21 having its center slightly offset from the cylinder axis and of a supplemental frustro cone 22 whose side surface 22 intersects substantially tangentially the sphere 21 along a circle 23 of the sphere indicated by a dotted line in Fig. 1 and whose top periphery constitutes the mouth of the cavity located in the plane end face 24 of the piston which extends parallel to the plane end face 25 of the cylinder head. Thus it will appear that the tapering frustro-conical neck 22 of the cavity communicates with the cylinder space.

This neck 22 is provided with a groove 26 registering with the passageway 14. Therefore, the jet of liquid and gaseous combustible matter issuing from the passageway 14 upon ignition of the fuel in chamber 13 will be admitted through the groove 26 into the interior spherical portion of the cavity 16 and by the eddy of air charge spinning therein will be rapidly and uniformly mixed therewith to thereby ensure complete combustion. Preferably, the bottom of the groove 26 approaches a tangent to the sphere 21 when viewed as in Fig. 1. The side walls 27 and 28 of groove 26 may extend parallel to each other and to a radius of the sphere 21 as shown in Fig. 3. In this event the cavity is symmetrically disposed with respect to a radial plane of the cylinder extending centrally through the groove 26. Alternatively, however, the cavity may be laterally disposed from such symmetrical portion as shown in Figures 2 and 4 so that the wall 27 of groove 26 extends tangentially to the sphere 21 or so that the other wall 28 of the groove 26 extends tangentially to the sphere 21.

Preferably, the axis 29 of the passageway 14 which may coincide with that of the precombustion chamber and the fuel injection device 17 is inclined at an angle $\alpha$ to the axis of the cylinder whereas the axis 30 of the neck portion 22 of the cavity 16 is inclined at an angle $\beta$ thereto in a direction opposite to the inclination of the passageway 14. Very satisfactory results have been obtained with an angle $\alpha$ amounting to from 20° to 30° and with the angle $\beta$ amounting to from 15° to 25°.

The operation is as follows:

During the suction stroke the air entering the cylinder space is admitted thereto in a tanegntial direction indicated by the arrow in Fig. 2 owing to the eccentrical disposition of the inlet valve 3 with respect to the axis of the cylinder and because of the screen 5 mounted on the valve, whereby the air is caused to form an eddy. This revolving motion is maintained during the compression stroke and continues when the air at the end of the compression stroke is concentrated in the main combustion space formed by the cavity 7. The angular velocity of the eddy is even increased because the energy of the air stream is kept constant. After the fuel has been injected into the precombustion chamber 13 where it is ignited by contact with the highly heated compressed air, a jet of fuel particles that have not been burned yet and of products of decomposition and combustion of the fuel will be blown through the passageway 14 and through the groove 26 into the cavity 16. There such jet will produce an eddy which interferes with the eddy that existed in the cavity 16 prior to the instant of ignition. The jet entering through groove 26 tends to set up an eddy having a more or less horizontal axis whereas the eddy set up in the air during the compression stroke has a substantially vertical axis. The terms "horizontal" and "vertical" are used herein to denote the relationship to the cylinder axis under the assumption that the same is vertical. Hence, these terms must not be taken literally where the cylinder is disposed in an inclined or horizontal position.

Owing to the agitating effect of these eddies, the individual fuel particles are distributed over the entire volume of the cavity 16 and are thus intimately mixed with the air therein. In this manner it is ensured that all oxygen present in the combustion air partakes in the combustion.

Depending on the particular conditions of operation such as the rotary speed of the engine, the condition (pressure, temperature) of the combustion air, the penetrating power of the fuel jet issuing from the injection nozzle etc., it may be of advantage for an intimate mixture of the combustible matter with the air to so dispose the groove 26 that one of its walls lies tangential to the sphere 21 as shown in Figures 2 and 4, whereby the jet entering the cavity 16 through the groove 26 will promote or counteract the original eddy of the combustion air.

Hence, it will appear that it is the effect of the present invention to enhance a uniform distribution of the combustible matter issuing from the precombustion chamber 13 over the entire air charge concentrated in the cavity 16 constituting the main combustion chamber. The jet issuing from the precombustion chamber 13 will set up a powerful eddy in the chamber 16 about an axis extending other than parallel to the cylinder axis. This eddy cooperates with that set up prior to the ignition having an axis parallel to that of the cylinder to distribute the fuel uniformly over the entire volume of the cavity 16.

While the invention has been described in connection with a number of different embodiments thereof, it will be understood that it is capable of further modification, and this application is intended to cover any variations, uses, or adaptations of the invention following, in general, the principles of the invention and including such departures from the present disclosure as come within known or customary practice in the art to which the invention pertains, and as fall within the scope of the invention or the limits of the appended claims.

What I claim is:

1. In an internal combustion engine, the combination comprising a cylinder, a cylinder head mounted thereon and provided with a precombustion chamber and a passageway leading therefrom into said cylinder, a piston reciprocable in said cylinder to and from a position in proximity to said cylinder head and formed with a combustion cavity, said piston in said position confining a compression space with said cylinder head, said compression space including said precombustion chamber and said combustion cavity provided in said piston, said passageway extending substantially tangentially to the walls of said cavity when viewed in a cross-sectional plane passing through said cavity and said passageway in a direction substantially parallel to the walls of said extended passageway and being so disposed as to direct a jet of combustible matter into said cavity, a fuel injecting device mounted in said cylinder head and adapted to issue a jet of fuel into said chamber, an air inlet valve in said cylinder head for the admission of air during the suction stroke of said piston, and means effective during the suction stroke of said piston to impart rotary motion to said air about the axis of said cylinder to thereby set up an eddy in said cavity about said axis.

2. Internal combustion engine as claimed in claim 1 in which said cavity has a shape substantially composed of a sphere disposed tangentially to the end face of said piston and of a supplemental frustro cone, the tapering frustro-conical neck of said cavity communicating with the cylinder space.

3. Internal combustion engine as claimed in claim 1 in which said cavity has a shape substantially composed of a sphere supplemented by a frustro cone, the latter constituting a tapering neck of said cavity communicating with the cylinder space, such neck being provided with a groove, the bottom of the groove extending substantially tangentially to said sphere, such groove being substantially aligned with said passageway of said precombustion chamber and being thereby adapted to admit said jet of combustible matter into said sphere.

4. Internal combustion engine as claimed in claim 1 in which said cavity has a bulbous shape with a neck portion tapering towards its mouth located in the end face of said piston, said neck portion being provided with a groove which in said position of said piston registers with said passageway and thereby admits said jet of combustible matter into the interior of said bulbous cavity.

5. Internal combustion engine as claimed in claim 4 in which said groove has a side wall extending tangentially to said bulbous cavity.

6. In an internal combustion engine, the combination comprising a cylinder, a cylinder head mounted thereon and provided with a precombustion chamber and a passageway leading therefrom into said cylinder and spaced from the axis thereof, the axis of said passageway being inclined an angle from 20° to 30° to the axis of said cylinder, a piston reciprocable in said cylinder and formed with a bulbous combustion cavity having a neck portion tapering towards the mouth of said cavity located in the end face of said piston, the axis of said neck portion being inclined an angle from 15° to 25° to the axis of said cylinder in a direction opposite to the inclination of the passageway, said neck portion being provided with a groove registering with said passageway, a fuel injecting device mounted in said cylinder head and adapted to issue a jet of fuel into said chamber, an air inlet valve in said cylinder head for the admission of air during the suction stroke of said piston, and means provided on said valve and adapted to conduct the air admitted into the cylinder tangentially thereinto to thereby set up an eddy in said cavity about an axis parallel to that of the cylinder.

References Cited in the file of this patent

FOREIGN PATENTS

| | | |
|---|---|---|
| 499,778 | Great Britain | Jan. 30, 1939 |
| 528,448 | Great Britain | Oct. 30, 1940 |
| 567,608 | Great Britain | Feb. 22, 1945 |
| 747,836 | Germany | Oct. 16, 1944 |
| 1,026,060 | France | Jan. 28, 1953 |
| 1,059,636 | France | Nov. 10, 1953 |